June 7, 1949.  L. R. YOCAM ET AL  2,472,505
ANIMATED FISHING LURE
Filed Oct. 24, 1947  2 Sheets-Sheet 1

INVENTORS
LEE ROY YOCAM
AND DONALD K. NEWMAN
By Eugene D. Farley
Atty.

June 7, 1949.  L. R. YOCAM ET AL  2,472,505
ANIMATED FISHING LURE

Filed Oct. 24, 1947  2 Sheets-Sheet 2

INVENTORS
LEE ROY YOCAM
AND DONALD K. NEWMAN
By Eugene D. Farley
Atty.

Patented June 7, 1949

2,472,505

UNITED STATES PATENT OFFICE 2,472,505

ANIMATED FISHING LURE

Lee Roy Yocam and Donald K. Newman,
Vancouver, Wash.

Application October 24, 1947, Serial No. 781,938

6 Claims. (Cl. 43—42.01)

The present invention relates to an animated fishing lure, it being the principal object of the invention to provide a fishing lure which simulates a small aquatic animal in that the extremities thereof move in a realistic manner as the lure is drawn through the water.

The manner in which the foregoing and other objects of the invention are accomplished will be apparent from the following specification and claims, considered together with the accompanying drawing, wherein:

Figure 1:
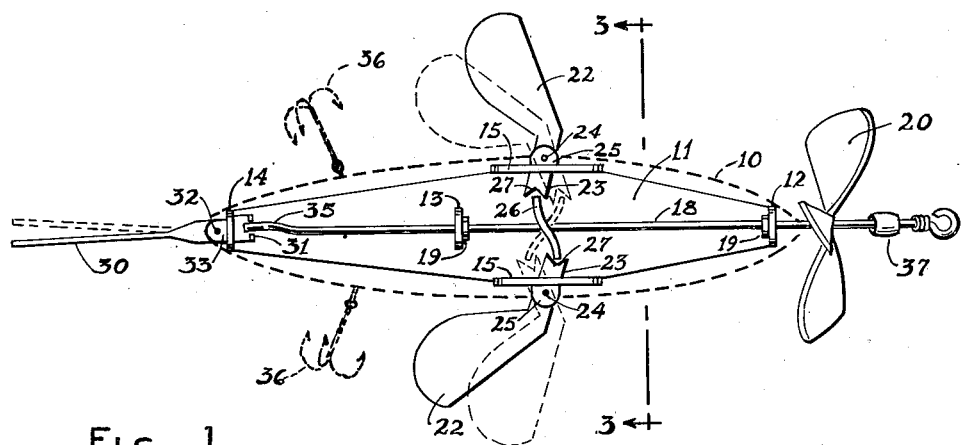
Figure 1 is a top plan view of the mechanism of the fishing lure of the invention.
Figure 2:
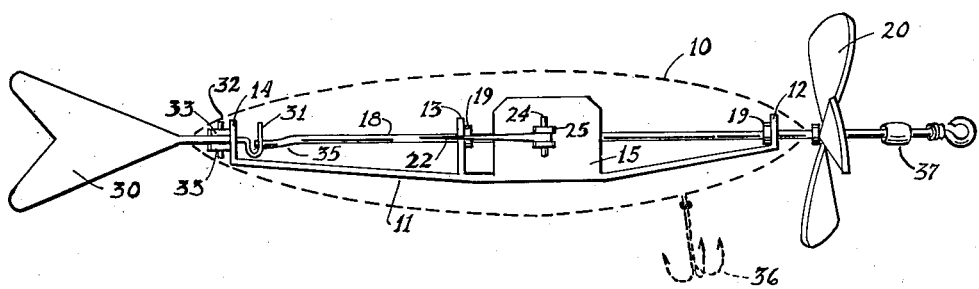
Figure 2 is a side elevation of the mechanism of the fishing lure of the invention.
Figure 4:
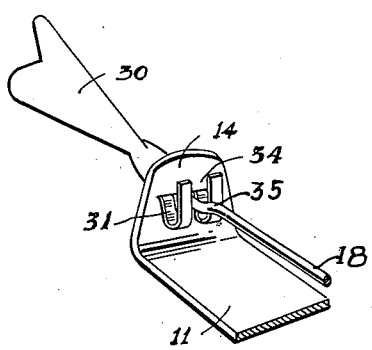
Figure 4 is a fragmentary perspective view of the tail portion of the fishing lure of the invention in one of its embodiments.
Figure 3:
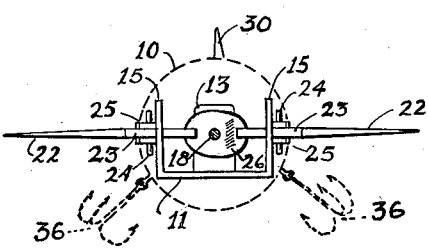
Figure 3 is a transverse section of the mechanism of the fishing lure of the invention taken along the line 3—3 of Figure 1.

Considering the drawing in greater detail:

The animated fishing lure described herein comprises a body or hull 10, which may be fabricated from wood, plastic or other suitable structural material in the form of a small animal or, particularly, a fish. Affixed to the body and preferably within the same is a frame for mounting the animating mechanism. This comprises a base portion 11, a forward standard 12, an intermediate standard 13, a rear standard 14, and a pair of side standards 15, 15. The forward and intermediate standards are perforated to provide access for the shaft 18, which is mounted rotatably within the perforations, but which is prevented from being displaced longitudinally by the washers 19, 19 soldered or otherwise securely affixed to the shaft and bearing against the standards. Suitable means are provided for rotating the shaft, as the screw propeller 20 attached to the forward end thereof and adapted to be rotated by the hydraulic pressure exerted upon its blades as the lure is drawn through the water.

Pivotally attached to the body of the lure are a plurality of movable members. These are projecting parts, such as legs extending downwardly from the body when the lure is made to represent a small animal, or, as illustrated in the drawing, fins 22, 22 extending outwardly from the body when the lure is designed to simulate a fish. Attached to the fins and preferably formed integrally therewith are the arms 23, 23 each of which extends through a slot or perforation in its respective side standard, being held in place pivotally by means of a rigid pin 24 inserted through the brackets 25, 25 which extend outwardly from the side standards.

Means are provided for interconnecting the shaft 18 with the fin arms 23, 23 whereby to cause the fins to oscillate with the rotation of the shaft. It is preferred to employ for this purpose a cam attached to the shaft between the forward standard 12 and the intermediate standard 13. This is adapted to engage and activate the fin arms with attached fins, which therefore act as followers of the cam. Although various forms and arrangements of cams may be employed, it is preferred to apply one in the shape of an elliptical disc 26 disposed concentrically of the shaft, but obliquely with respect to the longitudinal axis thereof. The edges of the disc are bent slightly, better to engage V-shaped grooves 27, 27 provided in the fin arms. Then as the cam revolves with the shaft, oscillatory motion is induced in the fins in a plane parallel to the longitudinal axis of the shaft.

Although it is preferred to employ for the purpose of the invention a cam of the type described above, it will be obvious to one skilled in the art that other types of cams may be employed as equivalents therefor.

Also pivotally attached to the body of the lure, but at the rear end thereof, is a tail 30. This is mounted in a manner similar to the mounting of the fins, it being provided with a tail arm 31, preferably formed integrally with the tail, inserted in a slot in the rear standard 14 and held in place by a rigid pin 32 extending through the brackets 33, 33 on the rear standard, and through the tail arm. The inner extremity of the tail arm is bent upwardly substantially normal to the longitudinal axis of the shaft, and is provided with a slot 34. The tail is operatively connected to the shaft 18 through the crank 35 formed as a terminal extension of the shaft and adapted to extend into the slot in the tail arm. Rotation of the shaft and hence of the crank causes the tail to oscillate about the pin 32. Movement of the tail may be correlated as desired with the movement of the fins, which also oscillate with the rotation of the shaft, by adjusting the relative positions of the cam 26 and the crank 35 on the shaft.

Other components of the lure assembly comprise one or more gangs of hooks, 36, 36 which are affixed to the body of the lure and are adapted to snare a fish attracted thereto, and the swivel 37 or equivalent means on the forward end of the shaft for attaching a line to the lure.

Figure 5:
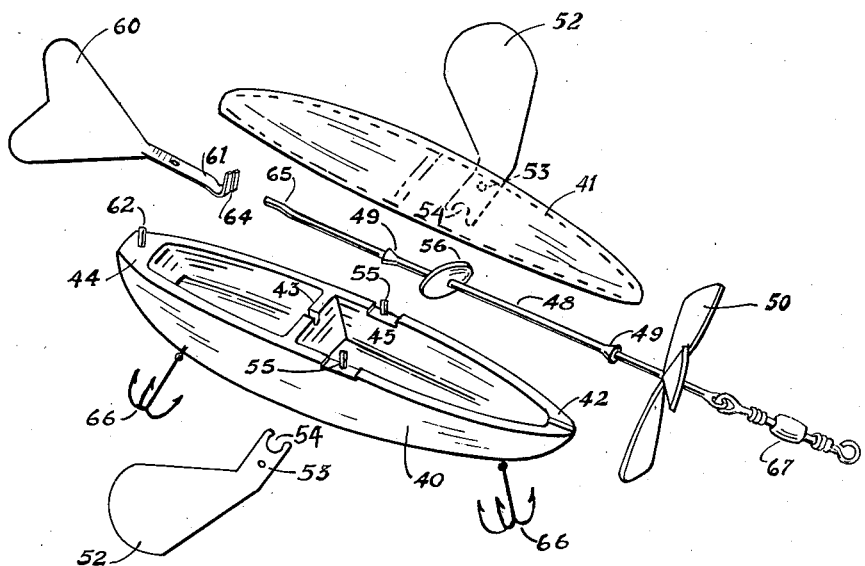
Figure 5 is an exploded view in perspective illustrating the fishing lure of the invention in another of its embodiments.

In an alternate and preferred structure embodying the principles of the animated fishing lure of the invention, the frame supporting the animating mechanism is made integrally with the body of the lure. Such a structure is illustrated in Figure 5. In this embodiment, the lure comprises a hollow body or hull made from wood or plastic and having relatively thick walls. For convenience in manufacturing, assembling and servicing, the body may be made in two parts, i. e. a lower portion 40 and an upper portion or top 41, which may be held together by means of suitably disposed screws or clips (not shown), or which may be fused together by use of a suitable adhesive. Disposed transversely of the body are the front crosspiece or end piece 42, the intermediate crosspiece 43, and the rear crosspiece or end piece 44. These correspond to the forward, intermediate and rear standards, respectively, of the embodiment of Figures 1–4, while the side walls 45, 45 correspond to the side standards of that embodiment. The forward and intermediate crosspieces are perforated or grooved for bearingly mounting therein the shaft 48. This is held against longitudinal displacement by the shoulders 49, 49 formed integrally with the shaft and bearing against the crosspieces in the body. Also attached to the shaft is the propeller 50, which is adapted to turn the shaft as the lure is drawn through the water.

Fins 52, 52 are mounted pivotally on the sides of the body. These are provided with perforated fin arms 53, 53 having in the ends thereof U-shaped grooves 54, 54. Embedded or driven into the sides of the body are the fin pins 55, 55 which are adapted to penetrate the perforations in the fin arms. There thus are provided pivot points about which the fins oscillate.

Operative connection of the fins to the shaft is had through the cam 56 which, as in the embodiment previously described, comprises an elliptical disc disposed obliquely on the shaft and having its edges riding within the grooves in the fin arms. Rotation of the cam with the turning of the shaft thus causes oscillation of the fins.

The tail 60 is mounted pivotally on the body in a manner similar to the fins, the tail arm 61 being formed integrally with the tail and perforated to provide access for the tail arm pin 62 embedded in the rear crosspiece of the body. The inner extremity of the tail arm is bent upwardly substantially normal to the plane of the tail arm, and has a slot 64. On the end of the shaft 48 is a crank 65 which engages the slot 64 so that as the crank turns with the shaft, oscillation of the tail about the pin 62 is induced.

Also included in the assembly of the embodiment of Figure 5 are the gangs of hooks 66, 66 and the swivel 67 by means of which the lure is attached to a fishing line.

In operation, the lure is drawn through the water by casting or trolling, whereupon the propeller revolves because of the impingement of the water upon its blades. This rotates the shaft which drives the cam and the crank, thereby causing oscillation of the fins and the tail. There thus is imparted to the lure a realistic animation which is attractive to fish and which induces them to strike the lure.

Having now described our invention in preferred embodiments, what we claim as new and desire to protect by Letters Patent is:

1. An animated fishing lure which comprises a body, a shaft rotatably mounted on said body, means on said shaft for rotating the same, a plurality of movable members pivotally attached to said body, an arm bearing a groove attached to each of said movable members, and an elliptical disc disposed obliquely on said shaft and adapted to engage said grooves in said arms, whereby to cause said shaft as it rotates to oscillate said movable members in a plane parallel to the plane of said shaft.

2. A fishing lure adapted to be drawn through the water and to simulate the motion of an aquatic animal, said lure comprising a body, a shaft rotatably mounted on said body, means for rotating said shaft, a plurality of movable members pivotally attached to said body, on said shaft a cam which engages said movable members, whereby to oscillate the same during rotation of said shaft, a tail pivotally attached to said body, and means operatively interconnecting said shaft and said tail for effecting the oscillatory movement thereof.

3. An animated fishing lure which comprises a body, a shaft rotatably mounted in said body, means for rotating said shaft, a plurality of fins pivotally attached to said body, on said shaft a cam engaging said fins, whereby to oscillate the same by rotating said shaft, a tail pivotally attached to said body, a slotted arm on said tail, and a crank on said shaft adapted to turn within a slot in said tail, whereby to cause said tail to oscillate with the rotation of said shaft.

4. A fishing lure adapted to simulate the swimming motion of a fish, which lure comprises a body, a shaft rotatably mounted in said body, means for rotating said shaft, a plurality of fins pivotally attached to said body, an arm provided with a groove attached to each of said fins and extending inwardly toward said shaft, an elliptical disc disposed obliquely upon said shaft and engaging the grooves in said arms, whereby to cause said shaft to oscillate said fins in a plane parallel to the plane of said shaft, a crank on the rear terminal portion of said shaft, a tail pivotally attached to said body, and a slotted arm on said tail, said crank being adapted to turn within the slot in said arm, thereby effecting the oscillation of said tail.

5. An animated fishing lure comprising a body, a shaft rotatably mounted in said body, a propeller attached to said shaft for rotating the same as said lure is drawn through the water, a plurality of fins pivotally attached to said body, a grooved arm attached to each of said fins and extending inwardly toward said shaft, on said shaft a cam adapted to engage the grooves in said arms, whereby to cause the oscillation of said fins in a plane parallel to the plane of the axis of said shaft, a crank on the rear of said shaft, a tail pivotally attached to the rear of said body, a grooved arm on said tail extending toward and engaging said crank, whereby to effect the oscillation of said tail by the rotation of said shaft, on said body hook means for securing a fish as it strikes said lure, and on the forward end of said shaft means for the attachment of a fishing line.

6. An animated fishing lure comprising a hollow body, a shaft rotatably mounted in said body, means for rotating said shaft, a plurality of fins, on each of said fins a perforated fin arm adapted to extend inwardly into said body and having a groove in the inner extremity thereof, a plurality of fin arm pins in the side walls of said body, each of said fin arm pins being adapted to penetrate the perforation in one of said fin arms and thereby pivotally mount the same, an elliptical disc disposed obliquely on said shaft and engaging the grooves in said fin arms, whereby to cause said fins to oscillate with the rotation of said shaft, a tail, a perforated tail arm on said tail adapted to extend inwardly into said body and having a slotted terminal portion disposed substantially normal to the longitudinal axis of said tail arm, a tail arm pin in the rear wall of said body, said tail arm pin being adapted to penetrate the perforation in said tail arm and thereby pivotally mount the same, and a crank on the rear terminal portion of said shaft, said crank being adapted to turn within the slot in said tail arm, whereby to cause said tail to oscillate with the rotation of said shaft.

LEE ROY YOCAM.
DONALD K. NEWMAN.

REFERENCES CITED

The following references are of record in the file of this patent:

UNITED STATES PATENTS

| Number | Name | Date |
| --- | --- | --- |
| 966,068 | Williamson | Aug. 2, 1910 |
| 1,390,601 | Caldwell | Sept. 13, 1921 |
| 1,627,512 | Hughes | May 3, 1927 |